Oct. 17, 1933.   R. G. SCHWARZ ET AL   1,931,088
CONDIMENT HOLDER
Filed Nov. 18, 1932
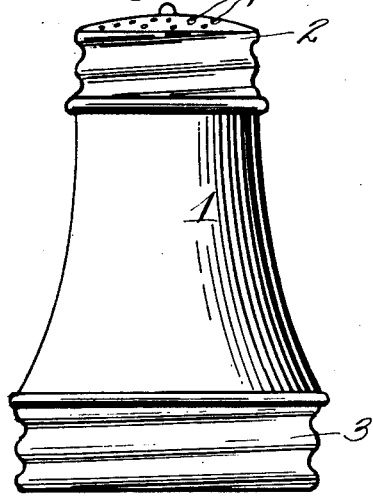
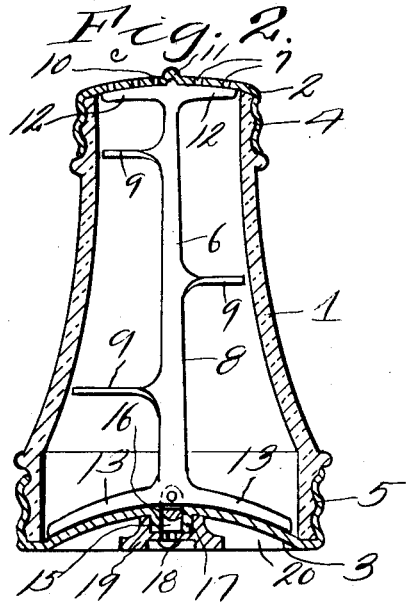
Inventors
Robert G. Schwarz
and Adolph H. Vorbusch
By Philip A. H. Terrell
Attorney Patented Oct. 17, 1933

1,931,088

UNITED STATES PATENT OFFICE 1,931,088

CONDIMENT HOLDER

Robert G. Schwarz, New Orleans, La., and Adolph H. Vorbusch, Pass Christian, Miss.

Application November 18, 1932
Serial No. 643,296

1 Claim. (Cl. 65—57)

The invention relates to condiment holders and particularly to salt and pepper holders, and has for its object to provide a device of this character adapted to be inverted over food and provided with an agitator controlled by a rotatable member in a chamber in the bottom of a holder and positioned whereby the operator may easily rotate the same for rotating the agitator, and causing discharge of salt and pepper onto the food, thereby obviating the objectionable shaking operation of condiment holders as at present constructed.

A further object is to provide a condiment holder with a removable top and bottom whereby access may be had to the interior of the body thereof from both ends for cleaning purposes, which is particularly advantageous in salt cellers which generally accumulate a hard substance on the interior thereof, incident to dampness, and which substance is not easily removed in salt cellers having one end closed.

A further object is to rotatably support the agitator on the removable bottom and the thumb engaging knob within a concavity in the bottom axially thereof.

A further object is to pivotally connect to the shaft of the agitator an extension shaft rotatably mounted in a bearing of the bottom and provided with a finger rotating knob and arms carried by the agitator and arching the inner convex side of the bottom for scraping the bottom during the rotation of the agitator. The pivoting of the agitator shaft to the agitator allows the scraper arms on the bottom to conform to the bottom incident to variations in manufacture where the arc of the bottom will vary, particularly when the bottom is stamped.

A further object is to form the agitator from a single piece of material, stamped to form, thereby reducing the cost of manufacture to a minimum.

A further object is to form the bottom from a single stamping and to provide the downwardly extending annular flange, forming the agitator shaft bearing, thereby obviating soldered connections and allowing a relatively long bearing to be formed in the bottom in a single stamping operation.

A further object is to provide means whereby there may be a slight axial movement of the agitator thereby allowing the top and bottom scraping elements to scrape either element independent of the other when so desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of the improved salt cellar.

Figure 2 is a vertical transverse sectional view through the salt cellar.

Figure 3 is a collective perspective view of the agitator and its control parts.

Figure 4 is a vertical transverse sectional view through a modified form of condiment holder wherein the bottom and top are made from a single piece of metal stamped to form and a slight axial movement allowed to the agitator for alternate top and bottom scraping.

Referring to the drawing, the numeral 1 designates the body of the condiment holder, which is preferably formed from glass, 2 a metallic cover, and 3 a metallic bottom, both being threaded on the ends of the body 1 as clearly shown at 4 and 5. By providing a removable top and bottom for the holder, it will be seen that access can be easily had to the interior of the body 1 for cleaning purposes, which is not possible in condiment holders at present constructed.

In condiment holders, particularly pepper holders, it has been found that the shaking operation is an objectionable one, not only to the operator, but to others at a table, and the same is often true of salt shakers. The present device is particularly designed to obviate the shaking operation and is provided with a rotatable bladed agitator 6, which, when the condiment holder is inverted, is rotated for agitating the contents of the holder and causing the same to be discharged through the apertures 7 of the removable cover 2. The amount discharged through the apertures 7 will be regulated according to the amount of agitation. Agitator 6 is preferably stamped from a single piece of flat material so as to reduce the cost to a minimum.

The agitator 6 comprises a flat shaft 8 having outwardly extending agitator arms on its opposite edges and which arms are designated by the numeral 9. Arms 9 are formed from the same stamping as the shaft 8 and are twisted into planes other than the plane of the shaft 8, thereby strengthening the arms for the agitator operation and forming agitator blades. The upper end of the shaft 8 is provided with a lug 10, which is seated in the recess 11 in the inner face of the removable cap 2 and forms a pivotal point for the agitator. Agitator shaft 8, at its upper end is provided with arcuate concentric arms 12, which engage the inner side of the removable cover 2 for scraping purposes and for causing discharge of condiments when the holder is in a vertical position over food. Arms 12 scrape solidified material from the inner surface of the cap, which is particularly advantageous where salt is used.

The lower end of the shaft 8 is provided with arms 13 arcuately shaped and conforming to the convexed inner side or surface of the bottom 3 for scraping the same during the rotation of the agitator. It will be seen that the arms 13 are flat in plane of the shaft 8 of the agitator and formed from the same stamping. Hingedly connected at 14 to the lower end of the shaft 8 is an extension shaft 15, which is rotatably mounted in the bearing 16 formed by the annular flange 17 of the bottom 3, and by providing this hinged connection, the arms 13 of the agitator will not become bound or stuck on the inner convexed surface of the bottom 3 during the scraping operation, and particularly from variations in dimensions, incident to manufacturing of stamped material.

Shaft 15 has riveted to the square portion 18 thereof a finger engaging knurled member 19 adapted to be engaged by the finger of the operator for imparting rotation to the agitator during the discharge operation. It will be noted that the finger engaging member 19 is entirely disposed within the chamber 20 in the bottom of the bottom 3 where it is not seen under ordinary conditions, but is conveniently located for operation when the holder is inverted for use.

Referring to the modified form shown in Figure 4, in this form the agitator 8 has a slight axial movement in the cellar, which may be used if so desired and allows a scraping operation on either the perforated discharge end 2a or the bottom 3, however this feature may be eliminated if desired. Another difference in the device, shown in Figure 4, is that the perforated discharge end 2a is formed integral with the body 1a of the cellar, thereby allowing these parts to be stamped from a single piece of material if desired, and from metal. Applicants do not limit themselves as to the particular kind of material from which the device is manufactured.

From the above it will be seen that a condiment holder is provided having an agitator and constructed in a manner whereby the agitator will not only agitate material but will scrape solidified material from the inner sides of the top and bottom during the agitating operation. It will also be seen that the agitator is formed from a single stamping with its shaft flat, therefore said flat will additionally agitate, which would not be the case if the shaft were round.

The invention having been set forth what is claimed as new and useful is:

The combination with a condiment holder having an agitator therein, of a shaft carried by said agitator, said shaft being rotatably mounted in a bearing of the bottom, said bearing being formed by an annular flange carried by the bottom and extending outwardly into a chamber in the bottom, a finger engaging member carried by the shaft and into a chamber of which said shaft and annular flange extend, said agitator being stamped from a single piece of flat material and comprising a flat shaft section, flat scraping arms for the top and bottom in the plane of the flat shaft section and agitator arms in planes other than the plane of the shaft and connected to the shaft by twisted portions.

ROBERT G. SCHWARZ.
ADOLPH H. VORBUSCH.